Aug. 6, 1929.  F. S. CARTWRIGHT  1,723,542
AUTOMATIC GEAR SHIFT FOR AUTOMOBILES
Filed Sept. 13, 1928  12 Sheets-Sheet 1

Inventor
Forest S. Cartwright
By
Attorney

Aug. 6, 1929.  F. S. CARTWRIGHT  1,723,542
AUTOMATIC GEAR SHIFT FOR AUTOMOBILES
Filed Sept. 13, 1928   12 Sheets-Sheet 3

Inventor
Forest S. Cartwright
By
Attorney

Aug. 6, 1929.    F. S. CARTWRIGHT    1,723,542
AUTOMATIC GEAR SHIFT FOR AUTOMOBILES
Filed Sept. 13, 1928    12 Sheets-Sheet 4

Inventor
Forest S. Cartwright

Aug. 6, 1929.  F. S. CARTWRIGHT  1,723,542
AUTOMATIC GEAR SHIFT FOR AUTOMOBILES
Filed Sept. 13, 1928   12 Sheets-Sheet 6

Inventor
Forest S. Cartwright

Attorney

Aug. 6, 1929.　　　F. S. CARTWRIGHT　　　1,723,542
AUTOMATIC GEAR SHIFT FOR AUTOMOBILES
Filed Sept. 13, 1928　　12 Sheets-Sheet 8

Inventor
Forest S. Cartwright

Attorney

Aug. 6, 1929.　　　F. S. CARTWRIGHT　　　1,723,542
AUTOMATIC GEAR SHIFT FOR AUTOMOBILES
Filed Sept. 13, 1928　　　12 Sheets-Sheet 9

Inventor
Forest S. Cartwright
Attorney

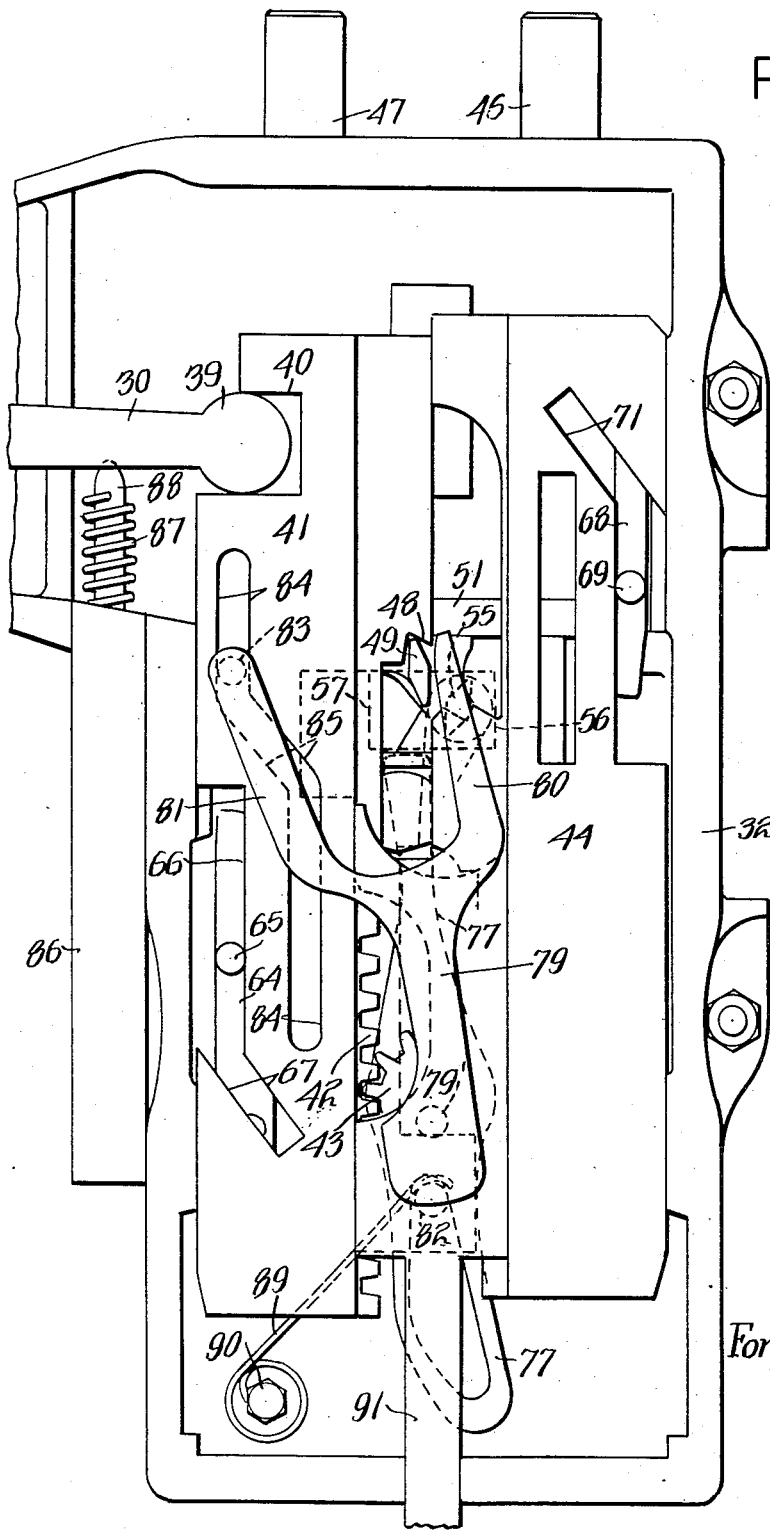

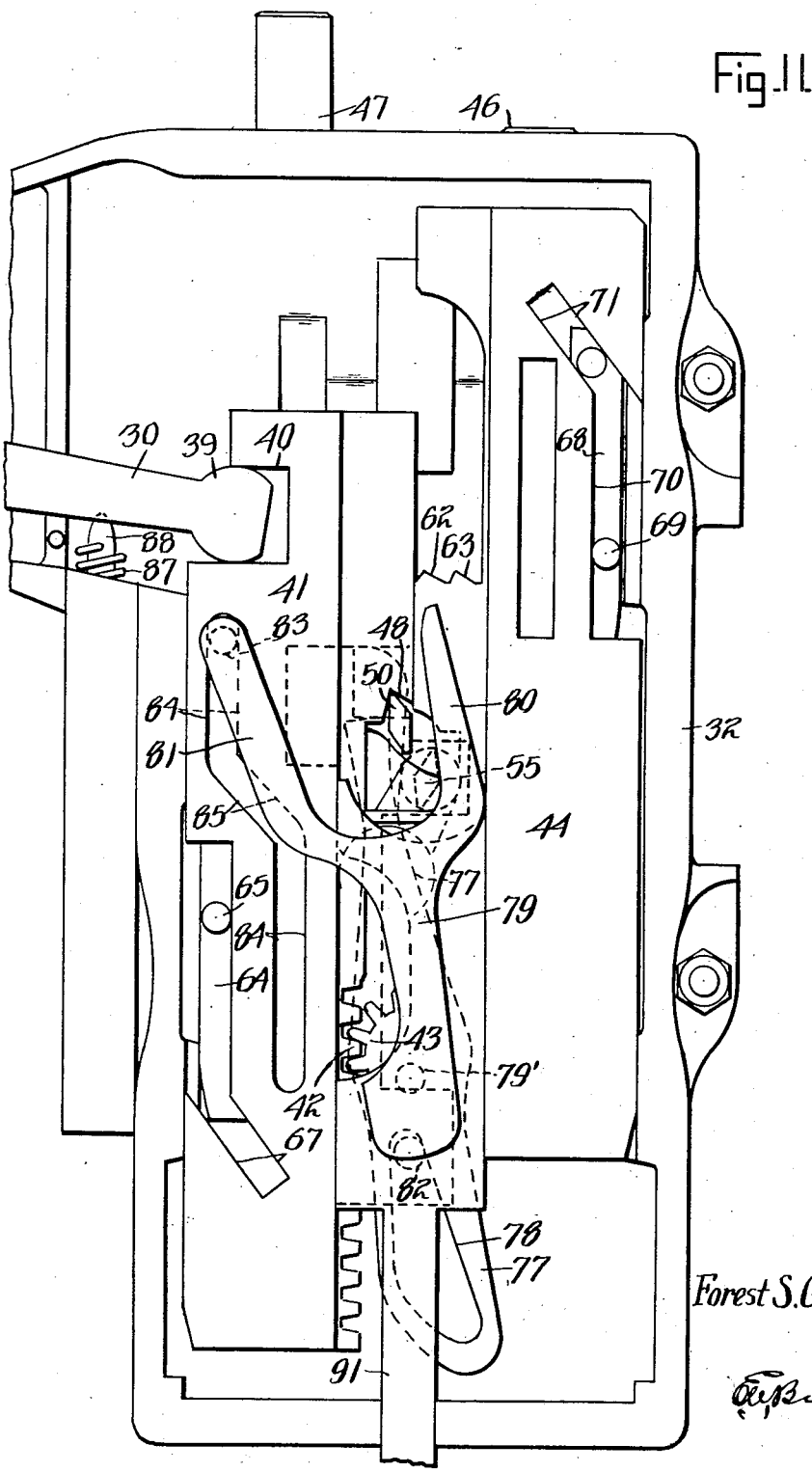

Aug. 6, 1929.  F. S. CARTWRIGHT  1,723,542
AUTOMATIC GEAR SHIFT FOR AUTOMOBILES
Filed Sept. 13, 1928  12 Sheets-Sheet 12
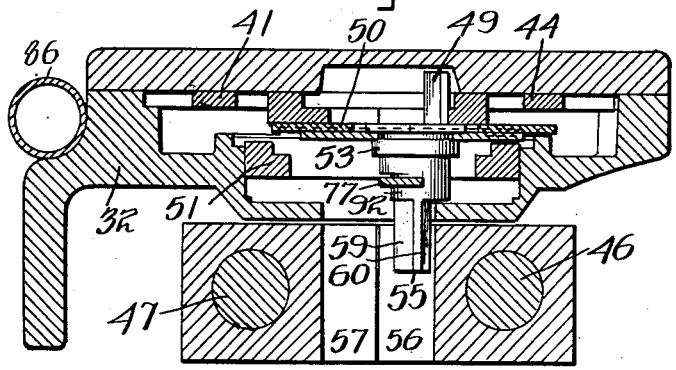
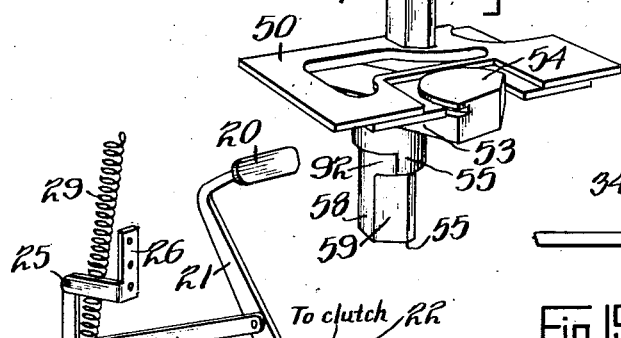
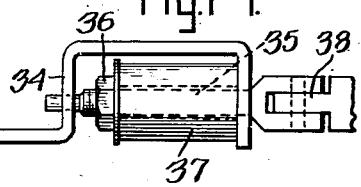
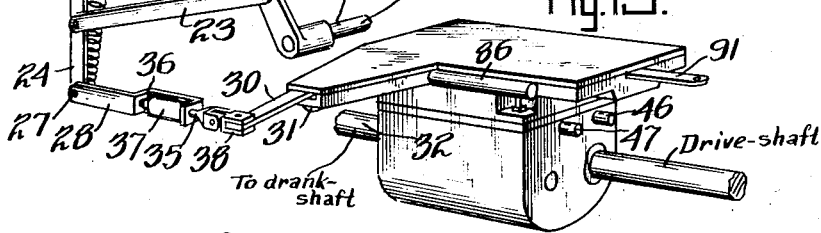
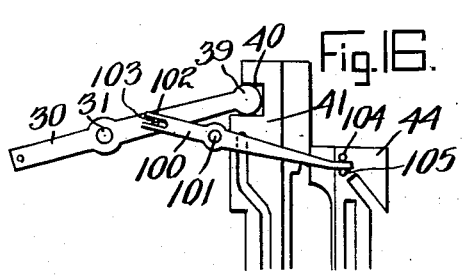
Inventor
Forest S. Cartwright
By
Attorney Patented Aug. 6, 1929.

1,723,542

UNITED STATES PATENT OFFICE.

FOREST S. CARTWRIGHT, OF INDIANAPOLIS, INDIANA.

AUTOMATIC GEAR SHIFT FOR AUTOMOBILES.

Application filed September 13, 1928. Serial No. 305,700.

This invention relates to automatic gear shifts for automobiles and the principal object of the invention is to provide means for changing the gear positions in a conventional automobile transmission, having low-speed ratio gears, intermediate gears, direct drive clutch and reversing gears. An object of the invention is to replace the ordinary gear shift lever by which the various speed changes of gears are made by a single control mechanism which in this case will preferably be the clutch pedal of the automobile.

An object of the invention is to enable the operator to shift the speed gears by successive pushing in and out of the clutch pedal. The invention is an improvement over my prior Patent No. 1,629,654, and consists of a simplification of the mechanism shown in the said patent.

Figure 1:
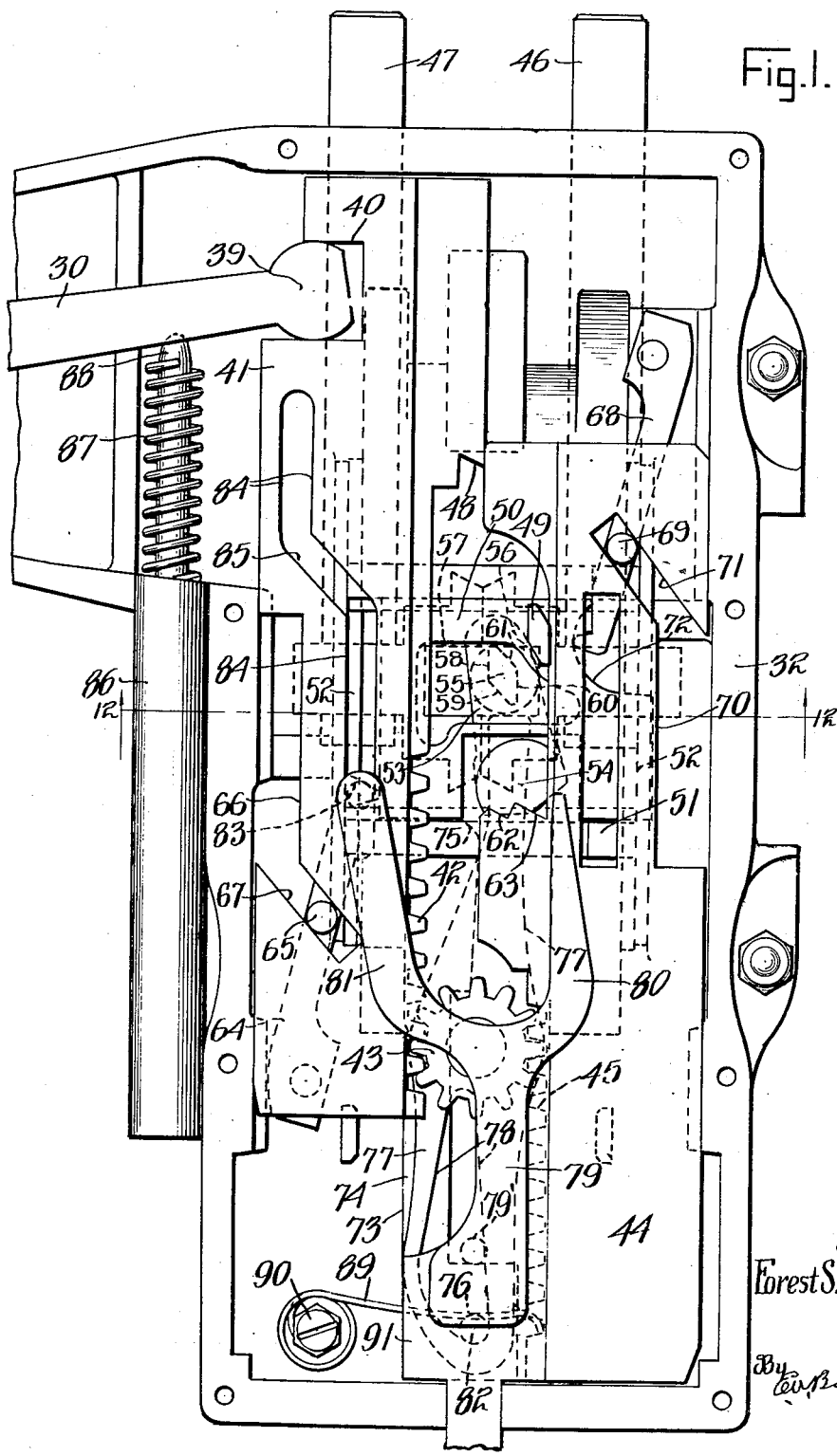
Figure 2:
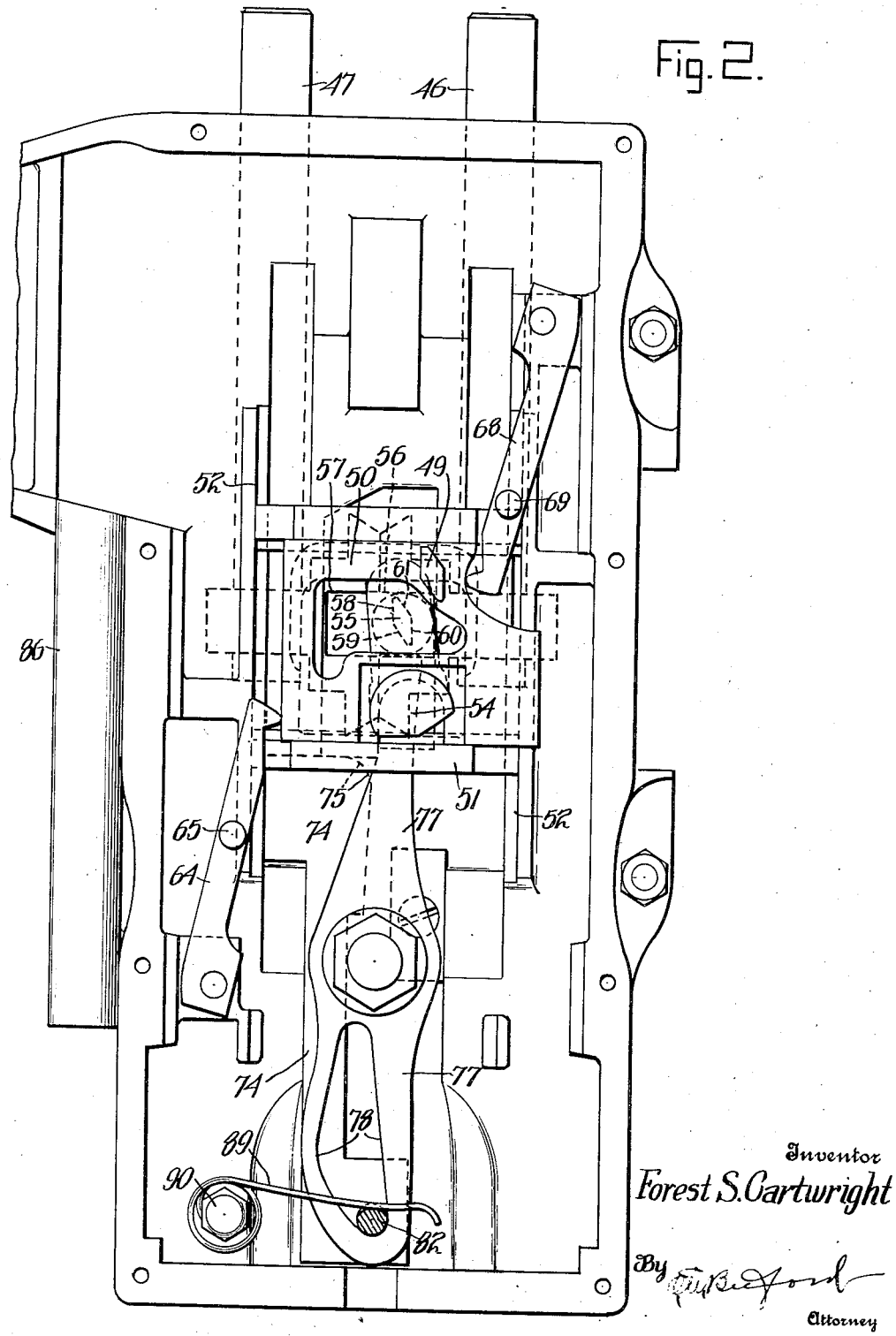
Figure 3:
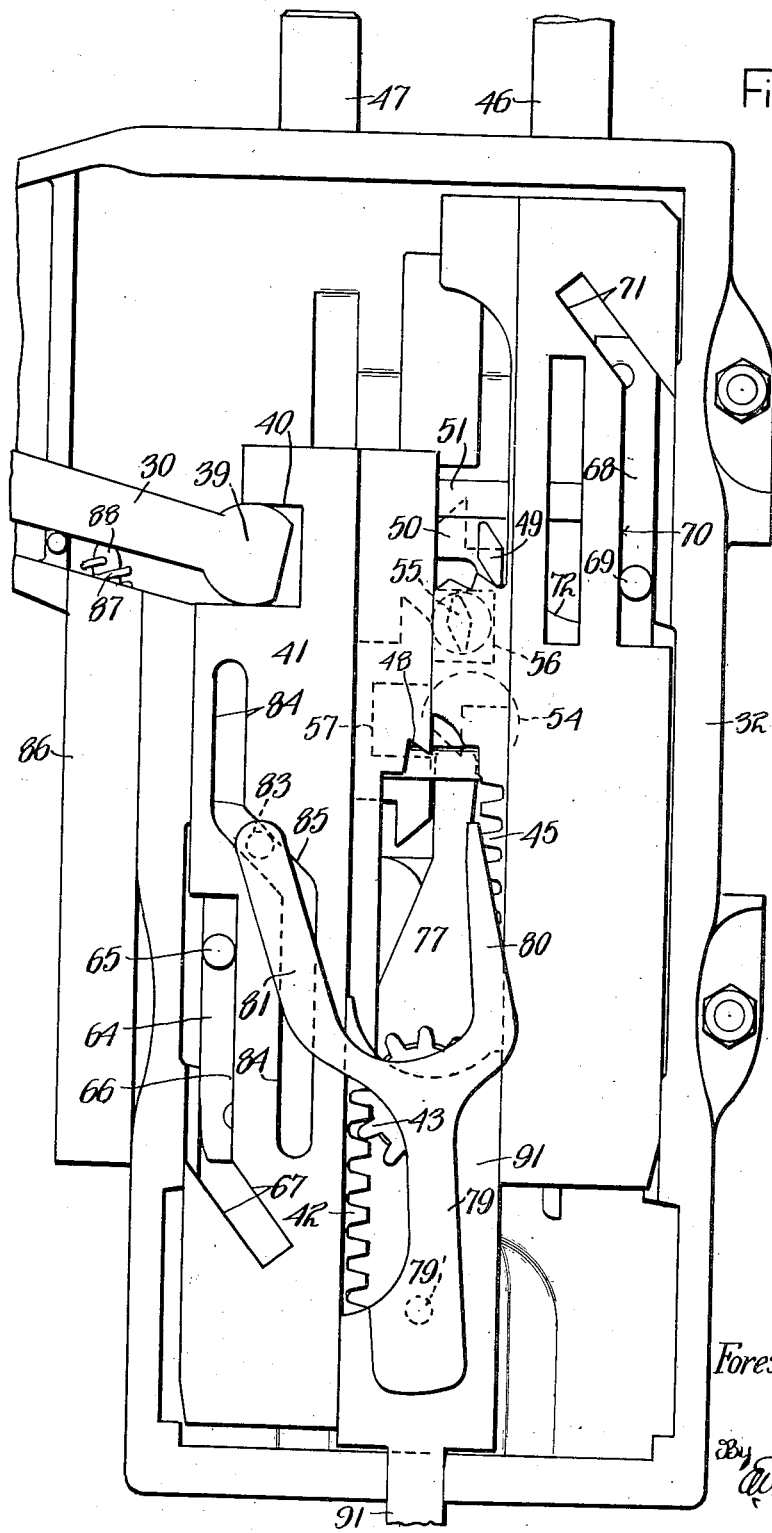
Figure 4:
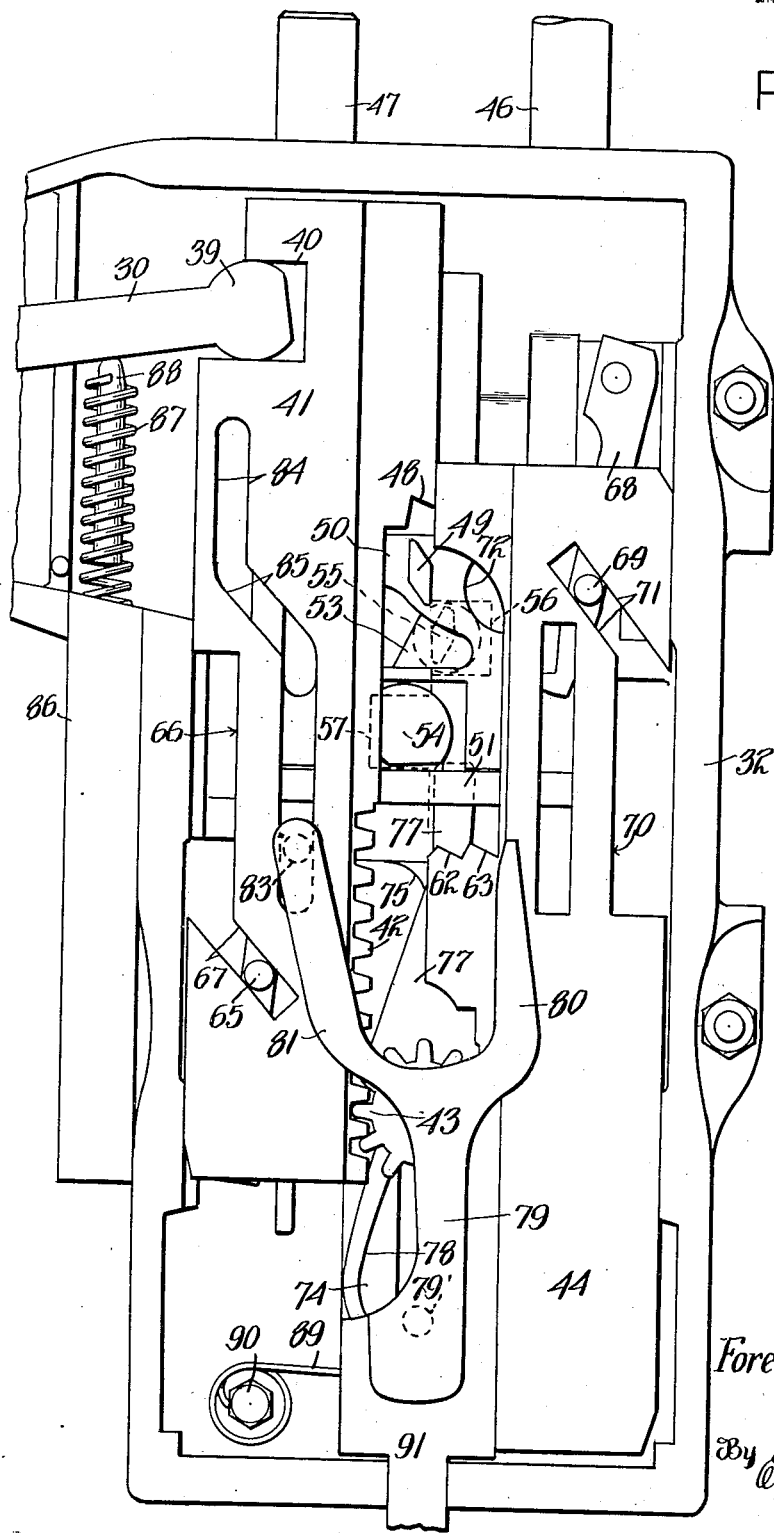
Figure 5:
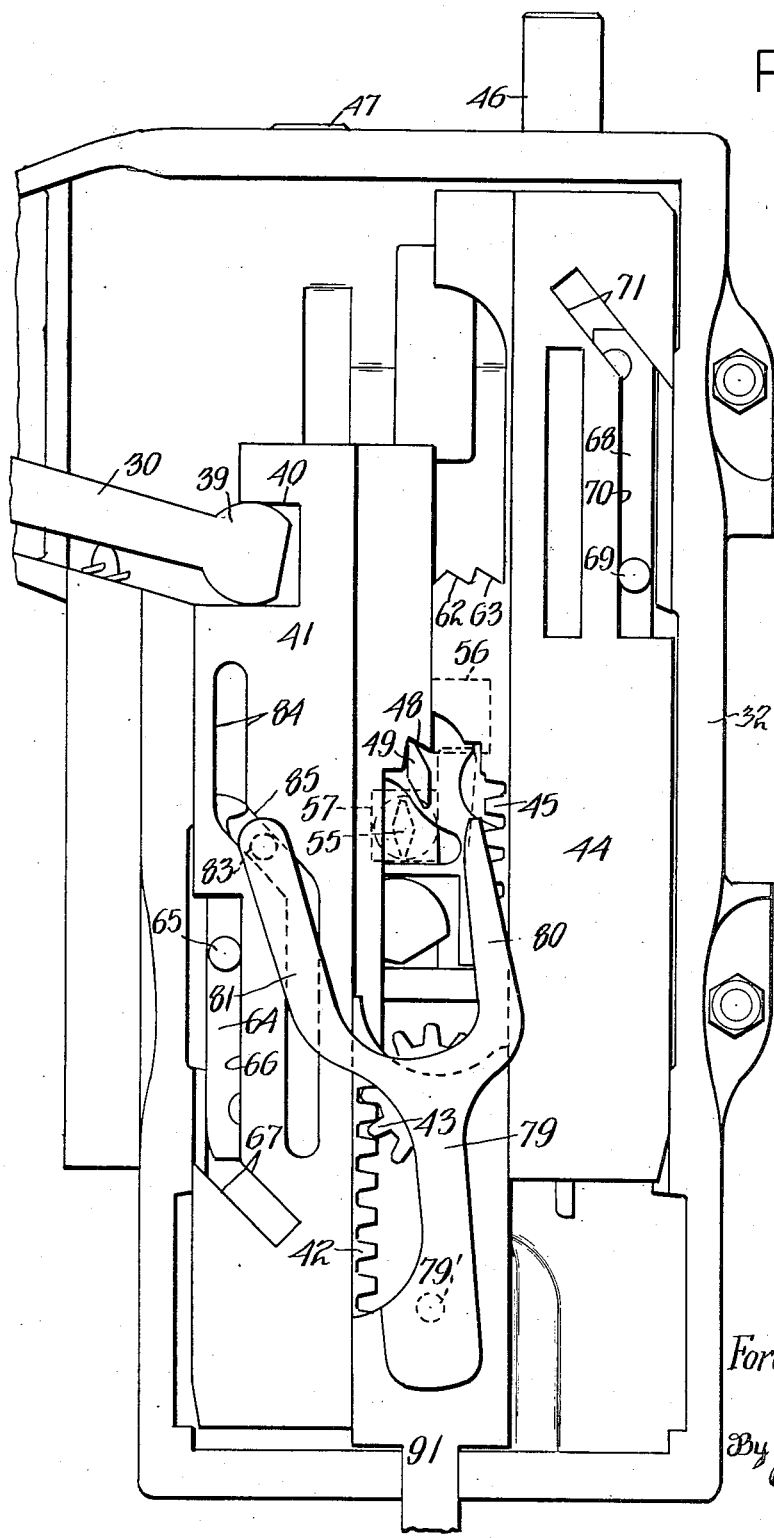
Figure 6:
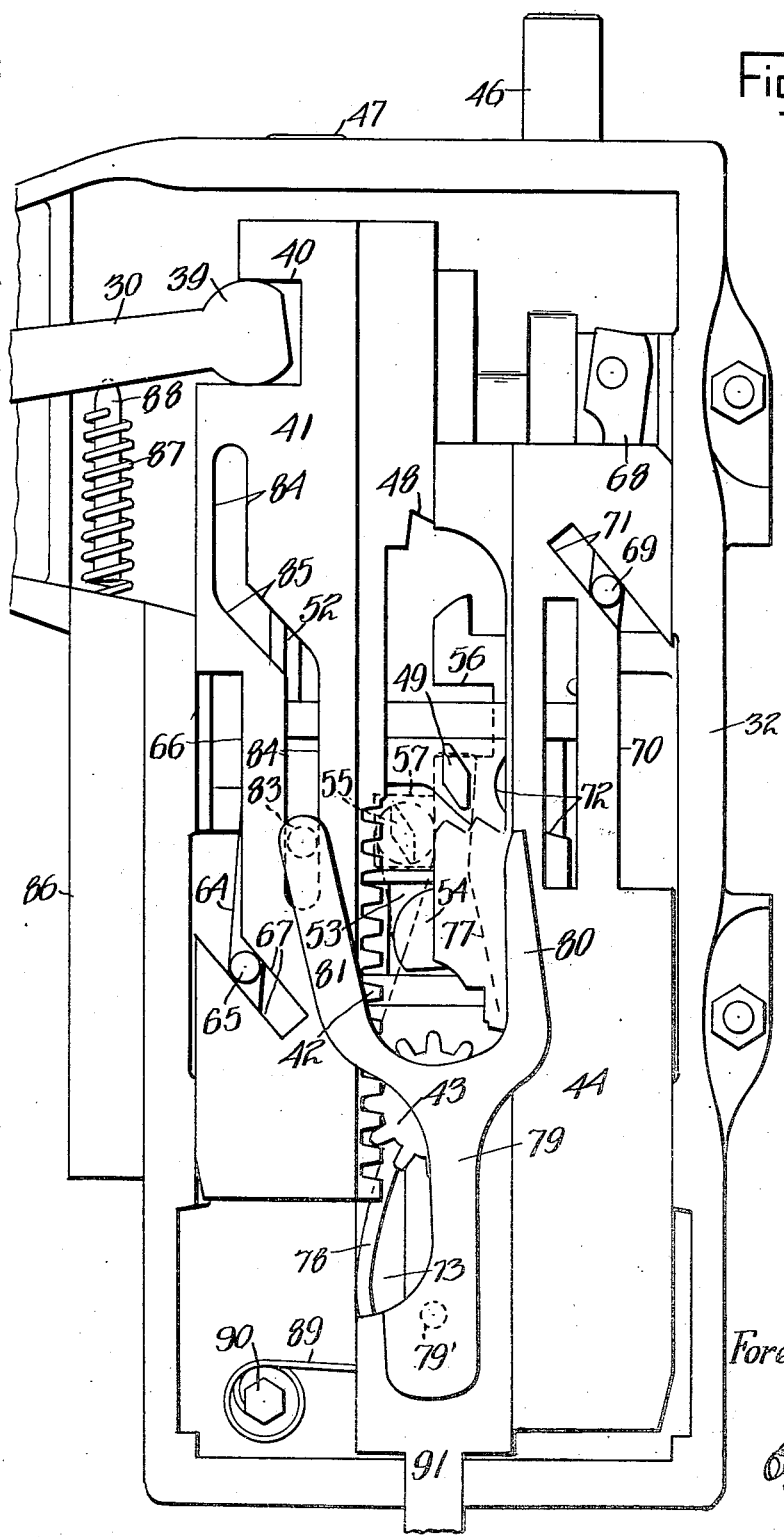
Figure 7:
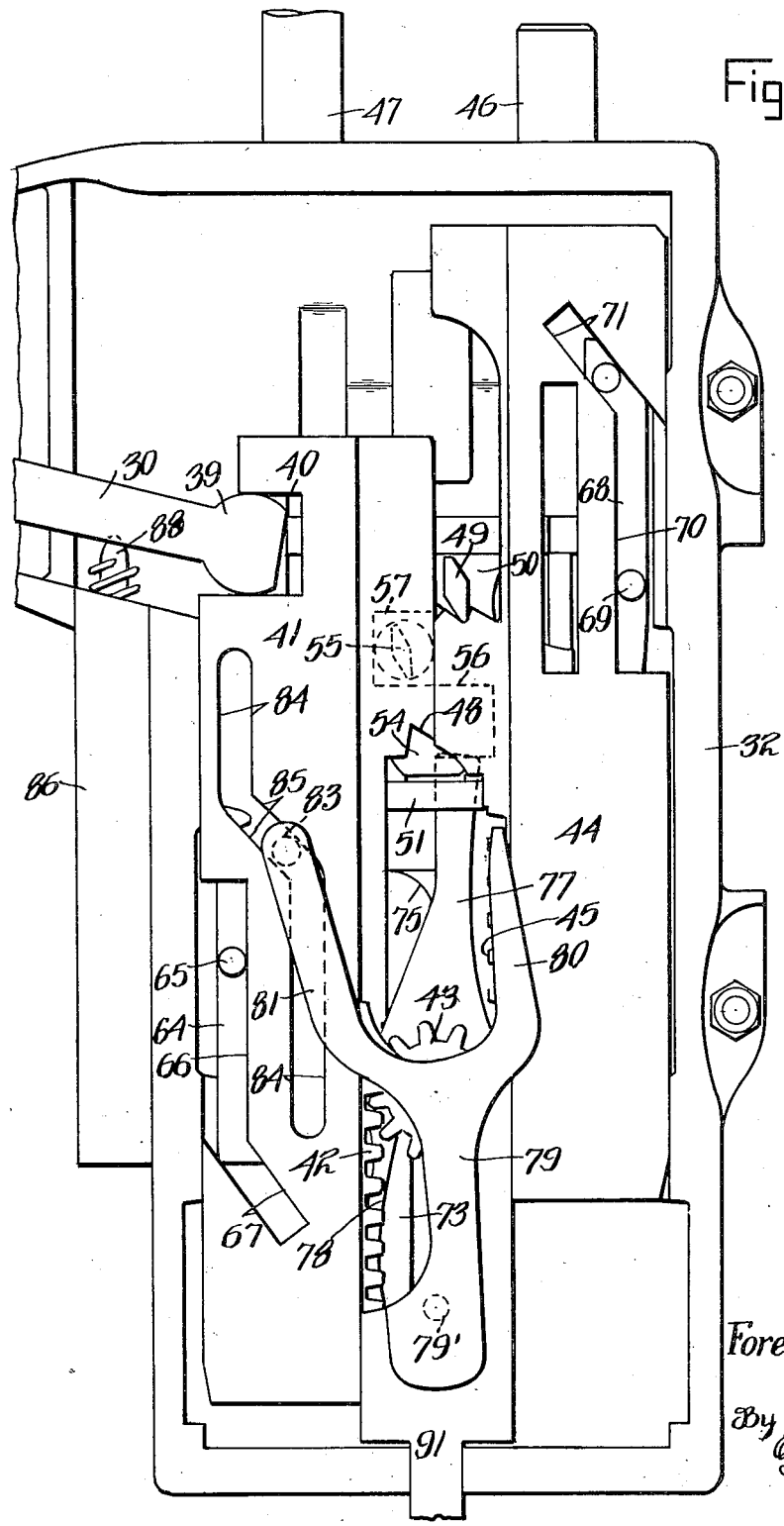
Figure 8:
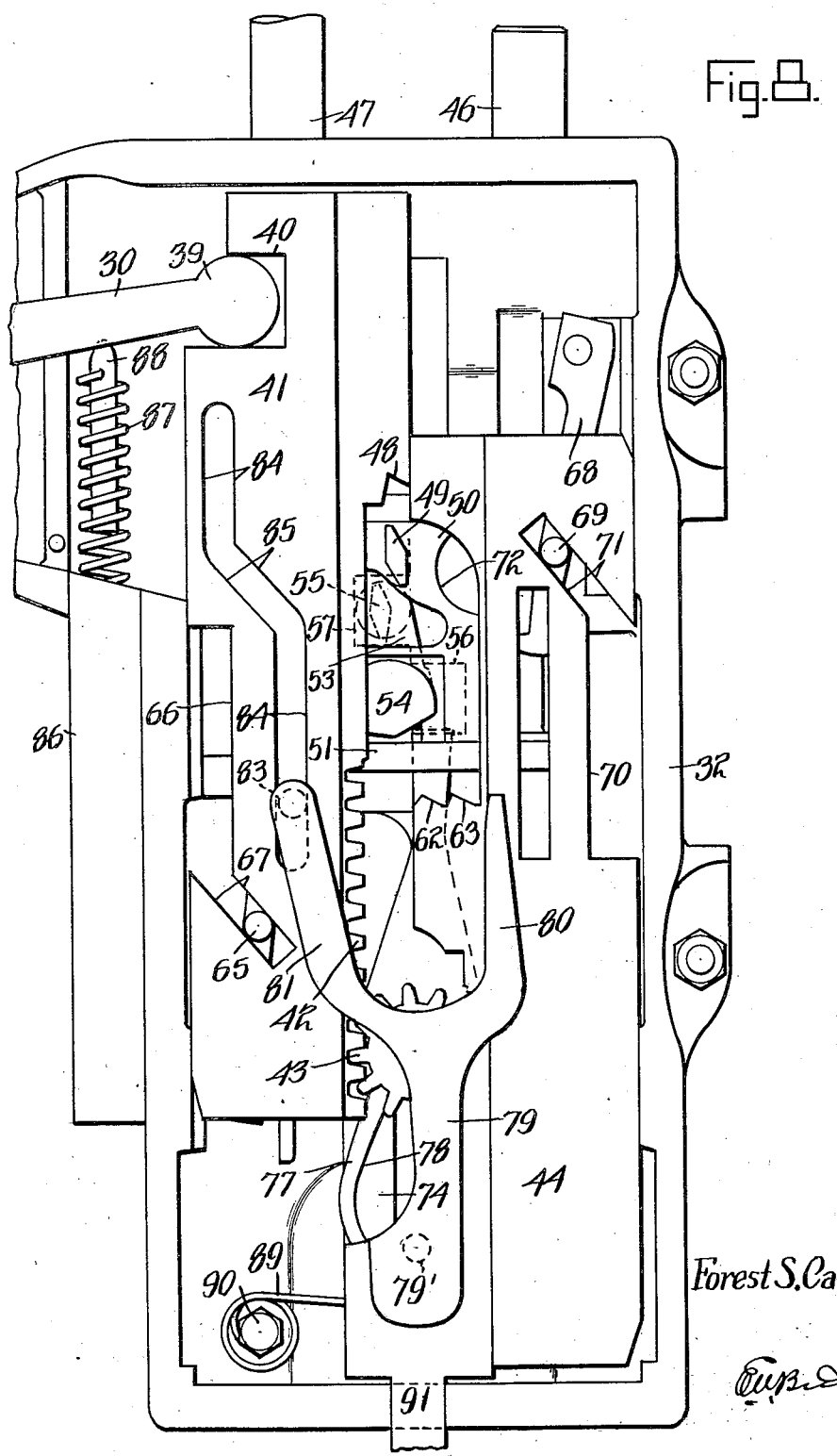
Figure 9:
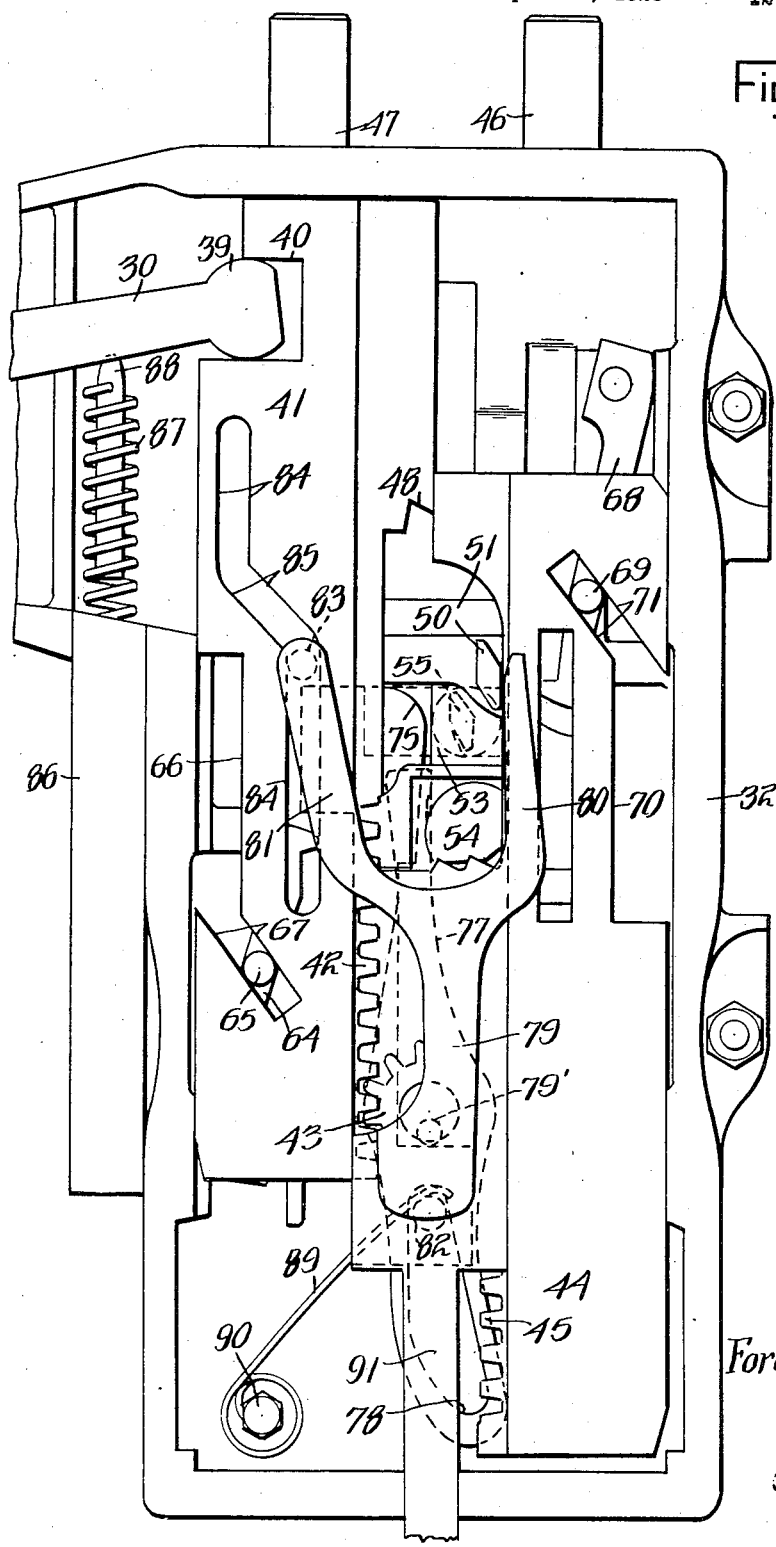

Referring to the accompanying drawings which are made a part hereof and on which similar reference characters indicate similar parts, Figure 1 is a plan view of the control mechanism associated with means for changing the speed gears, showing the transmission gears in neutral position, Figure 2 is a view similar to Fig. 1, with certain parts removed, showing the transmission gears in neutral position, but just ready to be moved into low gear position, Figure 3 is a plan view of the mechanism with certain parts removed, showing the mechanism in low gear position, with the gears in mesh, but with the clutch disengaged, Figure 4 shows the mechanism in low gear position, the gears in mesh but with the clutch engaged, Figure 5 is a similar view with parts removed, showing the position for intermediate speed, with the gears in mesh, but with the clutch disengaged, Figure 6 is a similar view, with parts removed showing the position in intermediate speed with the gears meshed and the clutch engaged, Figure 7 is a similar view with parts removed, showing the gears in high speed position with the gears meshed and the clutch disengaged, Figure 8 is a similar plan view with parts removed, showing the gears in high speed position with the gears meshed and the clutch engaged, Figure 9 is a similar plan view showing the first position at the beginning of reversing the automobile, with the gears in neutral position and the reversing lever pushed in.

Figure 10 is a similar plan view showing the second position for reversing the automobile in which the reverse lever has shifted the finger to engage the shifter rod, Figure 11 is a similar view of the third position in which the gears are meshed for reverse and the clutch disengaged, Figure 12 is a section on line 12—12 of Figure 1, Figure 13 is a perspective view of a detail, Figure 14 is a detail view of the cushioning element, Figure 15 is an exterior view of the device and parts as mounted on the transmission of a motor vehicle, and Figure 16 is a modified form of a part of the device.

In the drawings numeral 20 indicates the foot pedal of a conventional automobile gear shift having a rock arm 21 secured to a shaft 22 which passes through the gear housing and is operatively connected to the clutches on the automobile for throwing them into and out of operative position (see Fig. 15). A bar 23 is connected to arm 21 at one end and to a link 24 at the other end. This link 24 is pivoted at 25 to a bracket 26 on the frame of the automobile and at 27 to a link 28. A tension spring 29 is attached at one end to the frame of the automobile and at the other end to the lower end of the link 24. When the pedal is in normal position the spring extends to one side of the pivot joint 25. When the clutch pedal is pushed in the spring moves past the pivot joint 25 and assists in pushing out the clutch. This is an advantage particularly with some types of automobiles in which the clutch is hard to disengage. With other types I may dispense with it and attach the rock arm 21 directly to the link 28. The link 28 forms operative connection between the rock arm 21 and a lever 30 which is pivoted at 31 on the gear housing 32 of the automobile. A cushioning device is provided by having the end of the link 28 bent at 34 and holes therethrough. A link 35 is positioned through these holes. One end of the link is reduced and threaded to receive a nut 36. This nut confines a resilient plug or elongated resilient washer 37 against the bent end of the link 28. The end of the link 35 is forked and pivoted to a lug 38 which is itself pivoted on the lever arm 30. The link and the pivotally connected lug form not only a resilient connection between the rock arm 21 and the lever 30 but also a universal joint.

The lever 30 has a ball-like end 39 which engages a socket or notch 40 in the side of a slide bar 41. This slide bar is adapted to move lengthwise of the gear casing. This bar has on one side rack teeth 42 which engage with a pinion 43 which pinion is rotatably mounted on a pin positioned in a vertical position on the gear housing 32. Mounted parallel to the slide bar 41 is a slide bar 44 having rack teeth 45 meshing with the pinion 43. 46 and 47 indicate rods of conventional construction which control the change speed gears on automobiles having standard gear shift. When the rods 46 and 47 are in the position shown in Fig. 1 the gears are in neutral position. When the rod 46 is pushed forward the gears are in position for low speed, and when it is pulled back the car is in reverse. When rod 47 is pushed forward the gears are in position for high speed and when moved to its rearmost position they are in position for intermediate or second speed. The mechanism shown in Figs. 1 to 13 provides means for moving the rods 46 and 47 selectively to put the gears in any one of the four positions indicated.

The slide bar 41 has a lateral lug 48 which is adapted to engage a lug 49 on a table 50. This table is positioned in a frame 51 and may slide crosswise of the frame in suitable guideways. The frame itself is positioned to slide in a track 52 provided on the gear housing so that it may move in a direction parallel to the slide bars 41 and 44.

The table 50 has an arm 53 pivoted thereon at 54. This arm extends in a forward direction as shown in Fig. 2 and has at its forward or free end a finger 55 which is adapted to be inserted between pairs of jaws 56 and 57 in the gear shifting rods 46 and 47, respectively. The finger 55 has four working surfaces 58, 59, 60 and 61, which surfaces assist in rocking the arm 53 to the right or to the left to throw the finger 55 into operative engagement with the jaws 56 and 57 on the gear shifting rods 46 and 47. The slide bar 44 has a lateral lug 62 which strikes against the lug 49 on the table 50 to move the frame 51 forward as will be more fully described. The slide 44 has also a lug 63 adjacent lug 62 which lug engages the lug 49 under certain circumstances which will later be more fully explained.

Pivoted on the left of the housing is a latch like member 64. The forward free end of this latch may swing so that it engages the side of the table 50 to move the table to the right. The latch has on its upper side a pin 65 which extends up through a slot 66 in the slide bar 41. This slot 66 is elongated and extends parallel to the direction of movement of the bar itself with the exception of the lower end which is cut at a slant, as shown at 67. It should be obvious from the description above given that longitudinal movement of the slide bar 41 will cause no swinging movement of the pivoted arm 64 so long as the pin 65 is in the slot 66. When, however, the bar has moved forward until the pin 65 engages the slot 67 the sloping side of the slot will cause the pivoted arm 64 to move to the right. If the table 50 is in its rearmost position when the arm 64 moves over, then the table will be moved in the frame from the left to the right of the figure. When the frame in which the table 50 slides is itself in a forward position swinging in of the arm 64 will not affect the position of the table. A member 68 similar to 64 is pivoted on the right forward side of the gear housing. This member has a pin 69 which extends up through slots 70 and 71. It is shown in this latter slot in Fig. 1. As shown in Fig. 1 the outward free end of the lever 68 is in engagement with the table 50. The corner of this table has an arcuate portion cut away at 72 to allow the table to move to the right even when the lever arm is swung to the left as in Fig. 1 for a purpose which will appear. Slidably positioned in a slot 73 extending lengthwise of the housing is a member 74. This member has a rounded corner portion 75 at its forward end, which strikes the side of the finger 55 and forces it over to the left to the neutral position of the gears as they move from low to second, (Figs. 2 and 3). The member 74 has a hole 76 in its lower end. Pivoted on the pin on which is mounted the pinion 43 is a member 77 having its forward end extending up adjacent the end 75 of the slide 74. The rear portion of the member 77 has a slot 78 having narrowed ends and a somewhat widened central portion. A member 91 is positioned above the slotted member 77 and has its end extending out through the rear of the housing. A pin 82 on this member extends down through the slot 78 into the hole 76 in the slide 74. A member 79 has forks 80 and 81 on its forward end. The rear end of this member has a short depending lug 79' which engages a hole in the member 91. The fork 81 on the forward end of the member 79 has a depending pin 83 which fits in a slot 84 in the slide bar 41. The slot 84 in the slide bar 41 consists of two parallel portions which merge into each other through a slot 85. Forward movement of the member 79 will cause no lateral movement of the forks until the depending pin 83 reaches the slanting sides of the slot 85 to move the end of the fork to the left. This brings the right hand fork 80 over into engagement with a working side of the lug 49. as will be more fully described later.

In a cylindrical socket 86 on the gear housing 32 is positioned a compression spring 87. This spring has positioned therein a plunger 88 the end of which plunger seats in a small bore in the side of the lever 30 to normally urge the lever forward to move the slide into forward position, as shown in Fig. 1. A wire spring or other suitable spring 89 is secured at 90 to the gear housing and has its outer free end resting against the forward side of the pin 82 to urge the fork like member 79 normally to the rear carrying also the slide 74 with it.

The member 91 has a portion extending out of the rear of the gear housing (see Fig. 15). The end of this member is connected to any suitable lever or device under control of the driver for shifting the member 79 to its forward position to condition the mechanism for throwing the gears into position for reversing the automobile.

The operation is as follows:

Starting with the mechanism as shown in full lines in Fig. 1 the operator presses in the pedal clutch which moves the arm 30 to the rear to move the slide 41 to the rear and the slide 44 forward through the connection of the pinion 43. The lug 63 strikes the lower edge of the lug 49 and moves the frame 51 forward carrying with it the table 50 which carries the arm 53 pivotally secured thereto. The finger 55 engaging in the notch 56 in the bar 46 moves this to its foremost position, as shown in Fig. 3 the clutch however still being disengaged, because the operator has the foot pedal pushed in. When the foot pedal is released the slide bar 41 is moved forward and by the spring 87 the slide bar 44 moves backward until the sloping slot 71 engages the pin 69 on the lever 68 and swings the lower end of this lever to the left so that the inner end of the lever pressing against the table 50 will move it to the position shown in Fig. 4, where the gears are in mesh for low gear and the clutch is engaged ready to drive the car at low speed. To change from low speed to intermediate speed, the clutch pedal is again pushed in. The lug 48 striking the forward edge of the lug 49 moves the frame 51 to the rear, and the rounded corner portion 75 of the member 74 striking the side of the finger 55 moves this finger over to the left to the neutral position of the gears as they move from low to second gear, as shown in Fig. 5. This puts the gears in mesh for intermediate or second gear with the clutch still disengaged. When the foot pedal is released the spring 87 moves the respective slides 41 and 44 into starting position and as the slide 41 moves forward the lug 65 strikes against the side of the slot 67 and swings the arm 64 to the right to move the table 50 to the position shown in Fig. 6, in which the gears are in meshed condition for intermediate speed and the clutch is engaged preparatory to driving the car at intermediate or second speed. To change to high speed, the clutch is again pushed in, whereupon the lug 62 strikes the lower edge of the lug 49 and moves the frame forward with the finger back in engagement with the notch on the gear shifting bar 47 to move this bar forward to the position shown in Fig. 7. The gears are then meshed for high speed gear with the clutch still disengaged. When the foot pedal is released by the operator, the slide bars are returned to their normal position by the spring 87 and the cam slot 71 moves the pin 69 on the lever 68 again to the left and moves the table 50 to the left as shown in Fig. 8. The car is now in condition for high speed forward movement, and the clutch is engaged. Should the operator wish to change from high speed to intermediate speed and from intermediate speed back to high speed as is usually the case in congested traffic or upon the road when hills are encountered, he may do so without going through the whole cycle of speeds, simply by pushing upon his pedal clutch and pushing it all the way in, which operations will change alternatively from high to intermediate and intermediate back to high. For example, when the gears are as shown in Fig. 8 pressing in of the clutch will cause the lug 48 to strike the lug 49 and the finger 55 after being in engagement with the notch 57 on the gear shift bar 47 will move the rod to the rear to the position shown in Fig. 6. When the pedal clutch is released the table will move to the position shown in Fig. 7. To move back to high gear again the clutch pedal is again pushed in and the lug 62 will engage the lug 49 and will move the table and frame forward to carry the rod 47 to its forward position which is the position for high speed. To bring the transmission gears to a neutral position: It is evident that if the control arm 30 is stopped half way in its normal movement, then table 50, which controls the sliding of the transmission gears, will likewise be stopped at a half way point, which, in the standard gear transmission, is neutral. Thus, any stop controlled by the operator, such as a movable arm preventing the clutch pedal from being pushed out further than is necessary to bring the table 50 to a half way point, will effect the desired result of bringing the car to neutral.

To shift the gears for reverse the operator first puts the transmission gears into neutral position. By means connected to the end of the slide 91 he then pushes this slide in. This carries with it the member 79 having the forked ends 80 and 81. As the slide bar 41 is moved back by pushing out the clutch pedal, the pin 83 on the fork 81 following down the slot 84 engages the sloping edges of the slot 85 and swings the forked lever 79 on its pivot point and brings the right hand fork 80 against the face of the lug 49 and moves the table to the left. At the same time the depending pins 82 on the rear end of this forked member passing down through the perforation 76 comes in position to strike a cut-away side 92 on the depending finger 55 on the arm 53 and holds this finger in engagement with the notch 56 in the gear shift rod 46. As the pedal is further pressed in the lug 48 strikes against the lug 49 and moves the table 50 to the rear to move the rod 46 to rear as shown in Fig. 11. When the pedal is released the clutch is engaged with the gears in position for reversing the automobile. When it is desired to shift from reverse gear position the clutch is pushed into neutral position and the spring 89 moves the forked member 79 to the rear. The mechanism then assumes the position shown in Fig. 1.

In Fig. 16 is shown a modified form of means for moving the slide bars 41 and 44. In this construction a lever 100 is pivoted at 101 upon the gear housing. This lever has a forked end 102 which fits over an upstanding lug 103 upon the lever 30. The other end of this lever engages between two lugs 104 and 105 on the slide bar 44. Rocking the lever 30 will move the slide bar 41 in the manner described with respect to the preferred form of the invention, and through the instrumentality of the lever 100 slide bar 44 will be moved in the other direction in timed relation with the bar 44 in the same way as is done through the rack pinion construction described in the preferred form. In other respects this modified form is similar throughout to the construction shown above in the preferred form.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent, is:

1. In a gear shifting mechanism a pair of gear shifting rods having yokes thereon, a rock arm movable to engage with the yoke on either rod, a table supporting the rock arm, a pair of slide bars having slots cut at an angle to provide cam surfaces, a pair of levers pivotally mounted one at each side of the slide bars and having lugs engaging the said slots in the slide bars for reciprocating the table, means on the slide bars engageable with the table upon reciprocation of the slide bars for reciprocating the table in a direction at right angles to the movement imparted to it by the said pivoted levers, and manually operable means for reciprocating the said slide bars, substantially as set forth.

2. In a gear shifting mechanism a pair of gear shifting rods having yokes thereon, a table, a rock arm on the table engageable with the yokes for moving said rods forward and backward as the table is moved, a pair of slide bars operatively connected to the opposite ends of a pivoted member, means on said bars for shifting said rock arm to engage the yoke on either of the rods, and means for moving said shifting means to move one of said rods only to its rearmost position to move the gear shifting mechanism into position for reversing an automobile, substantially as set forth.

3. A gear shifting device for an automobile comprising a pair of gear shifting rods having yokes thereon, a rock arm movable to engage the yoke on either of the rods, a table for supporting said rock arm, a pair of slide bars having racks on their adjacent sides, a pinion rotatably mounted between the slide bars and having its periphery in engagement with the racks on the slide bars, a pair of levers pivotally mounted one at each side of the slide bars and having lugs engaging slots in the bars for moving the table at right angles to the slide bars, means on the said bars for moving the table in a direction parallel with the bars to move the said rods, a clutch pedal, operative connection between said clutch pedal and said table whereby rocking of the pedal will move the said table to move the gear shifting rods to positions for low gear, intermediate, or high gear, depending on which rod is engaged and what direction it is moved, substantially as set forth.

4. A gear shifting device for automobiles comprising a pair of gear shifting rods having yokes thereon, a pivoted arm having a finger engageable with a yoke on either of said rods, a table supporting said arm, means for shifting said table in a direction transverse to the said rods the said means comprising a pair of oppositely movable rack bars operatively connected to each other, pivoted levers engaging the said table and movable by the said bars to engage the table, means for moving the table in a direction parallel to the rods comprising means on the said bars engageable with the table, a lever pivotally mounted upon the gear housing of the automobile and in engagement with one of said bars, and operative connection between said lever and the clutch pedal of the automobile, substantially as set forth.

5. A gear shifting mechanism for automobiles comprising a clutch pedal, a lever pivotally mounted upon the gear housing of the automobile, operative connection between the clutch pedal and said lever, a pair of sliding bars, operative connection between the said lever and one of said bars, a rack on the inner edge of each of said bars, a pinion having its opposite side in engagement with the racks on the bars whereby movement of one bar in one direction will drive the other bar in the opposite direction, a pair of gear shifting rods having yokes thereon, a table, an arm pivotally mounted on said table, said arm having a finger engageable with a yoke on either of the said rods, a pair of levers pivotally mounted diagonally on opposite sides of said sliding bars, means for swinging the said levers upon longitudinal movement of the bars, the said levers being adapted at predetermined positions to shift said table laterally of the said bars, a lug on said table, and abutments on the said sliding bars adapted to contact with said lug upon a longitudinal shifting of the said sliding bars to move the table in a direction parallel with the said shifting rods, substantially as set forth.

6. A gear shifting device for automobiles comprising a housing, a pair of sliding bars reciprocably mounted in said housing, the bars being provided with cam slots, an operative connection between one of said bars and the foot pedal of an automobile, a member pivoted between the bars and having its opposite portions engaging the bars whereby movement of one bar will drive the other in the opposite direction, a frame slidably mounted in the said gear housing, a table slidably mounted in the frame, a lug on the said table, an arm pivotally mounted upon the said table, said arm having a finger movable to engage a yoke on either of a pair of gear shifting rods, lugs upon the sliding bars adapted to contact with the said lug on the table upon longitudinal movement of the bars, and arms on the gear housing having pins engaging the said cam slots in the slide bars for shifting said table laterally of the slide bars as the slide bars move to predetermined positions, substantially as set forth.

7. In a gear shifting mechanism for an automobile a pair of gear shifting rods having yokes thereon, an arm having a finger movable to engage the yoke on either of the rods, a pair of slide bars operatively connected to the ends of a member pivoted between them, means on the said bars for shifting the finger into engagement with the yoke on the rods, a clutch pedal, and resilient connection between the said clutch pedal and the said bars whereby shocks incident to the meshing of the gear teeth may be absorbed between the gear teeth and the clutch pedal, substantially as set forth.

In witness whereof, I have hereunto set my hand at Indianapolis, Indiana, this 3rd day of September, A. D. nineteen hundred and twenty-eight.

FOREST S. CARTWRIGHT.